March 23, 1954
H. C. MORRIS, SR
2,673,057
BAIT CONTAINER HOLDER
Filed June 29, 1951
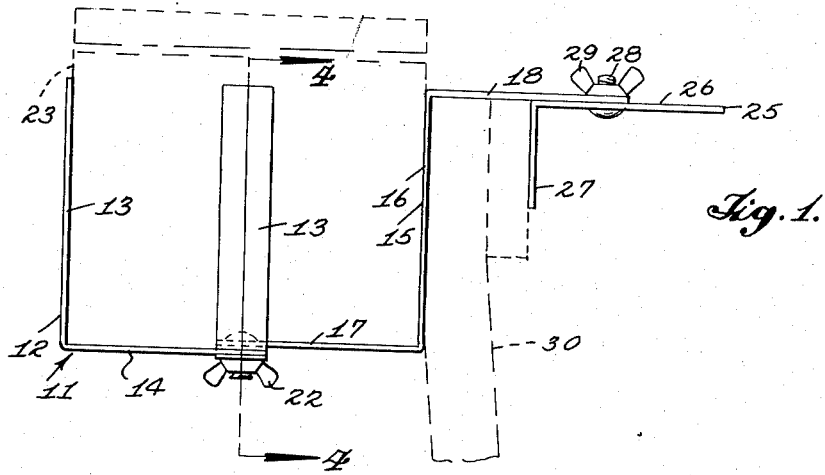
Fig. 1.
Fig. 2.
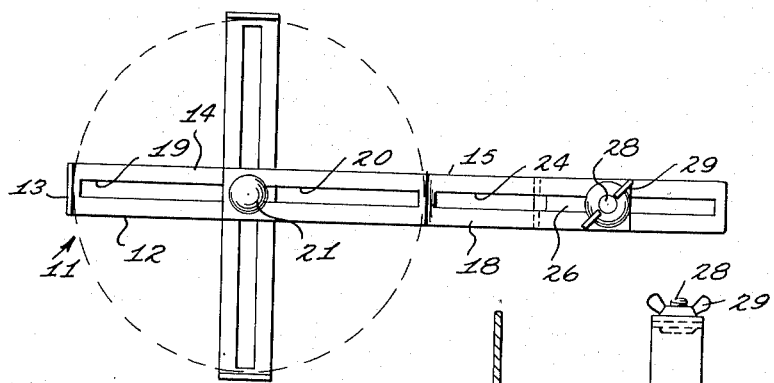
Fig. 4.
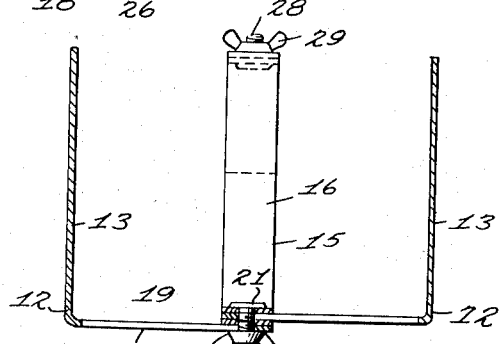
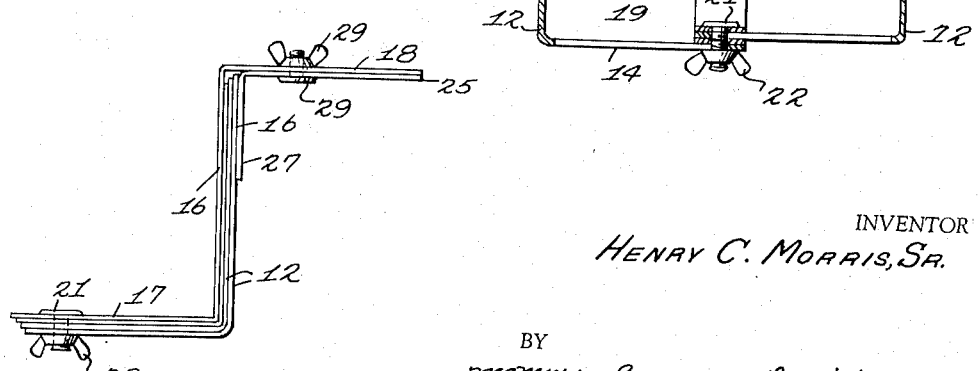
Fig. 3.
INVENTOR
HENRY C. MORRIS, SR.
BY
McMorrow, Berman + Davidson
ATTORNEYS Patented Mar. 23, 1954

2,673,057

UNITED STATES PATENT OFFICE 2,673,057

BAIT CONTAINER HOLDER

Henry C. Morris, Sr., Rochester, N. Y.

Application June 29, 1951, Serial No. 234,192

2 Claims. (Cl. 248—311)

This invention relates to supporting devices, and more particularly to an improved bait container holder adapted to be detachably secured to the side wall of a boat or to any other suitable support.

A main object of the invention is to provide a novel and improved bait container holder which is simple in construction, which is foldable to a compact size when not in use, and which is adjustable to receive various sizes of bait containers and to be engaged on various supporting members.

A further object of the invention is to provide an improved bait container holder which is inexpensive to manufacture, which is sturdy in construction, and which is easy to set up for use.

Further objects and advantages of the invention will become apparent from the following description and claims, and from the accompanying drawings, wherein:

Figure 1 is a side elevational view of an improved bait container holder according to the present invention, shown set up for use;

Figure 2 is a top plan view of the bait container holder of Figure 1;

Figure 3 is a side elevational view of the bait container holder of Figure 1, shown folded for transportation and storage;

Figure 4 is a cross-sectional view taken on the line 4—4 of Figure 1.

Referring to the drawings, the bait container holder is designated generally at 11 and comprises a plurality of similar L-shaped bars 12, each bar having a vertical arm 13 and a horizontal arm 14. Designated at 15 is a generally Z-shaped member having a vertical arm 16 substantially the same in height as the vertical arms 13 and having the horizontal arm 17 at its lower end and a horizontal 18 at its upper end, the arms 17 and 18 being directed in opposite directions, as shown in Figures 1 and 3. The horizontal arms 14 are formed with elongated, longitudinal slots 19, and the horizontal arm 17 is formed with an elongated, longitudinal slot 20. The horizontal arms 14 are overlapped with respect to each other and the horizontal arm 17 is engaged over overlapped portions of the arms 14 in the manner shown in Figures 1, 2 and 4, and a bolt 21 is engaged through the registering portions of the slots 19 and 20, a wing nut 22 being threadedly engaged on bolt 21, whereby the overlapped horizontal arms may be clamped rigidly to define a bottom support for a bait container, shown in dotted view at 23, disposed in the enclosure defined by the vertical arms 13 and 16. It will be readily apparent that the enclosure thus defined may be readily adjusted in size by adjusting the relative positions of the bottom arms 14 and 17 prior to the clamping of said bottom arms by the wing nut 22 and bolt 21.

The top arm 18 of the member 15 is formed with an elongated, longitudinal slot 24. Designated at 25 is an angle bar having a top arm 26 and a depending vertical arm 27. The top arm 26 is apertured to receive a bolt 28 on which is threadedly engaged a wing nut 29, whereby the position of the member 25 may be adjusted and clamped along the arm 18, the bolt 28 passing through the slot 24 of arm 18, as shown in Figure 2. The depending element 27 of angle bar 25 may thus be adjusted relative to the vertical arm 16 of member 15 to define a space in which to receive the top marginal portion of the wall of a boat, such as shown in dotted view at 30 in Figure 1, or to receive any other suitable support means for the container holder.

When the device is not in use, it may be folded to the nested position thereof shown in Figure 3, with the elements 12 nested against the arms 16 and 17 of the element 15, and the angle bar 25 adjusted so that the depending arm 27 thereof engages against the vertical arm 16 of the member 15. To set the device up for use, it is merely necessary to extend the elements 12 to define an enclosure for receiving the bait container, as above explained, said enclosure being locked by tightening the wing nut 22. The wing nut 29 is then loosened, and the arm 18 is engaged over the edge of the support to be employed for holding the bait container holder, the angle bar 25 then being locked in an adjusted position wherein the depending arm 27 thereof engages the outer surface of the support, as shown in Figure 1.

While a specific embodiment of an improved bait container holder has been disclosed in the foregoing description, it is understood that various modifications within the spirit of the invention may occur to those skilled in the art. Therefore, it is intended that no limitations be placed on the invention except as defined by the scope of the appended claims.

What is claimed is:

1. A bait container holder comprising a plurality of L-shaped members each having a vertical arm and a horizontal arm, a bracket member having a longitudinally slotted lower horizontal arm, a vertical arm and a longitudinally slotted upper horizontal arm, the upper horizontal arm extending in the direction opposite to said lower horizontal arm, a clamping bolt extending through the slot of said lower horizontal arm and adjustably and pivotally securing said lower horizontal arm to the horizontal arms of said L-shaped members to define a receptacle adapted to receive a bait container said L-shaped members and bracket member being nestable together in coplanar relation at times, and an angle bracket movably connected to said upper horizontal arm arranged to engage a support and to secure said bracket member to said support.

2. A bait container holder comprising a plurality of L-shaped members each having a vertical arm and a horizontal arm, the horizontal arm of each of said members having a longitudinal slot therein, a bracket member having a longitudinally slotted lower horizontal arm, a vertical arm and a longitudinally slotted upper horizontal arm, the upper horizontal arm extending in a direction opposite to said lower horizontal arm, a clamping bolt extending through the slots of the horizontal arms of the L-shaped members and the slot of the lower horizontal arm of said bracket member and pivotally adjustably securing said lower horizontal arm to the horizontal arms of said L-shaped member to define an extensible receptacle adapted to receive a bait container said L-shaped members and bracket member being nestable together in coplanar relation at times, an angle bracket, and means extending through the slot of said upper arm and said angle bracket and adjustably securing said angle bracket to said upper arm, the angle bracket being arranged to engage a support and to secure said bracket member to said support.

HENRY C. MORRIS, Sr.

References Cited in the file of this patent

UNITED STATES PATENTS

| Number    | Name         | Date           |
|-----------|--------------|----------------|
| 1,182,706 | Priest       | May 9, 1916    |
| 1,345,463 | Sandberg     | July 6, 1920   |
| 1,772,176 | Benjamin     | Aug. 5, 1930   |
| 1,855,009 | Clegg        | Apr. 19, 1932  |
| 2,215,411 | Sebring      | Sept. 17, 1940 |
| 2,367,256 | Atkins       | Jan. 16, 1945  |
| 2,541,434 | Nelson et al.| Feb. 13, 1951  |